(No Model.) 2 Sheets—Sheet 1.

C. BAHRET.
CENTER VALVE.

No. 518,172. Patented Apr. 10, 1894.

WITNESSES:
M. A. M. Frayser
C. C. Clark

INVENTOR
Christian Bahret
BY
E. B. Clark
ATTORNEY.

THE NATIONAL LITHOGRAPHING COMPANY,
WASHINGTON, D. C.

(No Model.) 2 Sheets—Sheet 2.

C. BAHRET.
CENTER VALVE.

No. 518,172. Patented Apr. 10, 1894.

WITNESSES:
M. M. Frayser.
E. B. Clark.

INVENTOR
Christian Bahret
BY
E. B. Clark
ATTORNEY.

UNITED STATES PATENT OFFICE.

CHRISTIAN BAHRET, OF FORT WAYNE, INDIANA, ASSIGNOR TO THE WESTERN GAS CONSTRUCTION COMPANY, OF SAME PLACE.

CENTER-VALVE.

SPECIFICATION forming part of Letters Patent No. 518,172, dated April 10, 1894.

Application filed April 1, 1893. Serial No. 468,636. (No model.)

*To all whom it may concern:*

Be it known that I, CHRISTIAN BAHRET, a citizen of the United States, residing at Fort Wayne, in the county of Allen, in the State of Indiana, have invented certain new and useful Improvements in Center-Valves; and I do hereby declare that the following is a full, clear, and exact description of the invention, which will enable others skilled in the art to which it appertains to make and use the same, reference being had to the accompanying drawings, which form part of this specification.

My invention relates to improvements in center valves or center seals employed in connection with a number of gas purifying boxes, preferably four, to direct the gas into and out of said purifiers and from one purifier to another.

The object of my invention is to provide a center valve or seal to be used in connecting the several boxes of an apparatus for purifying gas, so constructed and arranged as to admit of all of said boxes or purifiers being brought into operation at the same time, or of renewing an exhausted purifier or purifiers wherever located in the series without the least disturbance to the operation of any of the other purifiers in the series.

In other words, my invention permits the use of any one of the said boxes, or any number of said boxes, or all of said boxes at one and the same time, the operator thus being able at pleasure to make any box the first of the series.

The novel features of my invention consist in the peculiar construction and arrangment of the inlet and outlet caps mounted upon the distributing section of the valve and adapted to provide an independent inlet and outlet for the circulating gas.

The objects of my invention are accomplished by the mechanism illustrated in the accompanying drawings, forming part of this specification, in which similar letters and figures indicate corresponding parts in the several views.

Figure 5:
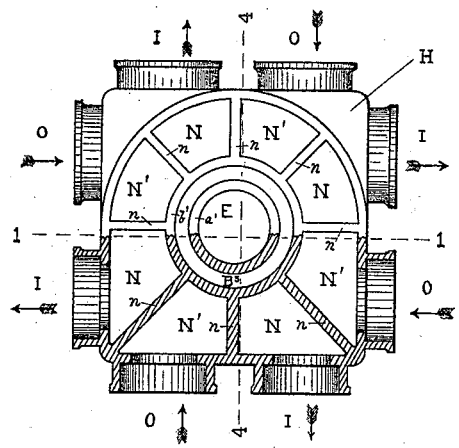
Figure 1:
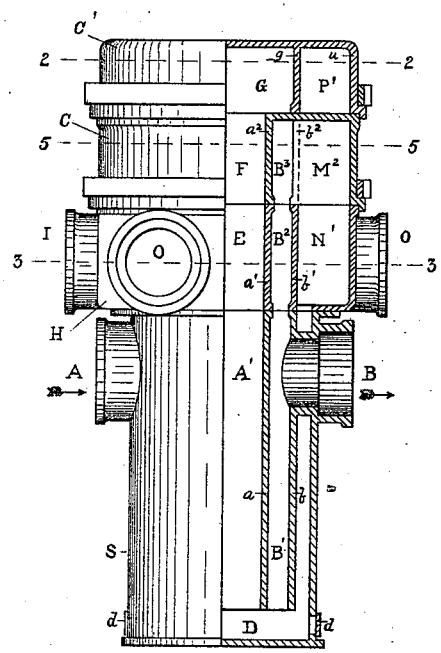
Figure 2:
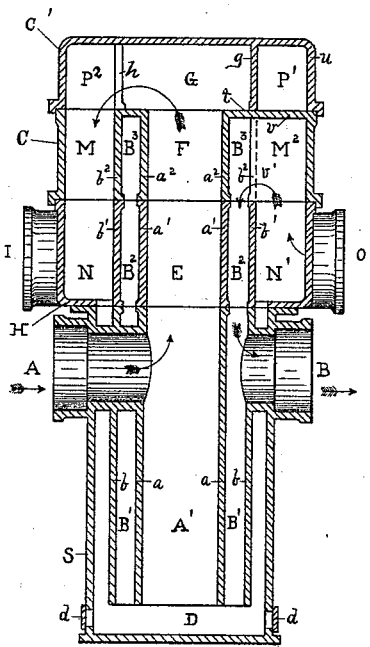
Figure 3:
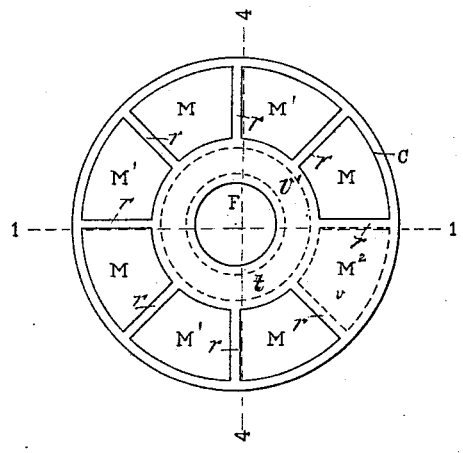
Figure 6:
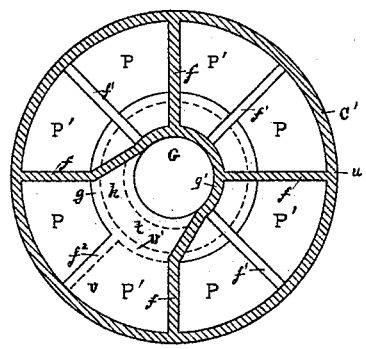
Figure 4:
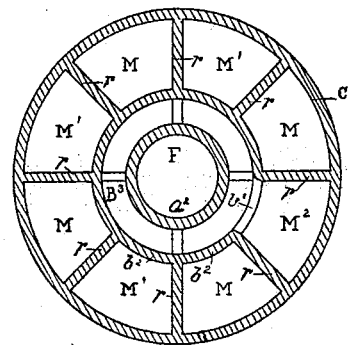
Figure 7:
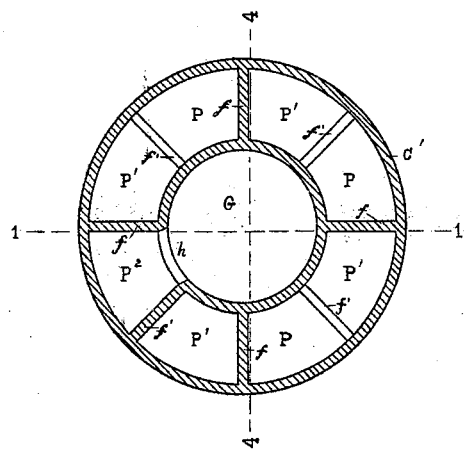

Figure 1 is a vertical half section of my invention taken on the lines 1—1 and 4—4 of Figs. 3, 4, and 5. Fig. 2 is a vertical section on the line 1—1 of Figs. 3, 4 and 5. Fig. 3 is a plan view of my improved outlet cap. Fig. 4 is a sectional plan view of the outlet cap taken on the line 5—5, of Fig. 1. Fig. 5 represents the distributing section of the valve partly in top plan and partly in horizontal section on the line 3—3 of Fig. 1. Fig. 6 is a sectional plan of a modified and preferable form of the inlet cap. Fig. 7 is a sectional plan of the inlet cap on the line 2—2, of Fig. 1.

The distributing section H of my center valve is preferably rectangular in form,— open at both top and bottom, and is properly mounted upon the seal pot S in a well known manner, the said seal pot being provided with the usual ports A and B for the main supply pipe and the main discharge pipe respectively, and with a drip or seal chamber D having the usual lid or door $d$ thereto. The seal pot S is also provided with the usual cylindrical partitions, $a$ and $b$, which extend from the top of the drip chamber D upward, flush with the top of said pot, the said partitions dividing the pot into a central inlet passage A′ and an annular outlet passage B′, surrounding the central passage.

The distributing section H is provided in the usual manner with the central tubular portion E, inclosed by the cylindrical partition $a'$, the annular space $B^2$ inclosed between the cylindrical partitions $a'$ and $b'$, Figs. 1, 2 and 5, and the distributing compartments N, N′, of uniform size, preferably eight in number, arranged in pairs and separated by the radial partitions $n$, $n$, each pair of the said distributing compartments being provided with an inlet port O and an outlet port I, all being arranged in a manner well understood by those skilled in the art. The central passage E, of the distributing section registers with and forms a continuation of the inlet passage A′, and in like manner the annular passage $B^2$ is a continuation of the outlet passage B′.

The outlet or lower cap C, preferably cylindrical in form, is constructed with the concentric walls $a^2$ and $b^2$ which are flush with the top and bottom thereof and inclose the tubular passage F and the annular passage $B^3$ forming respectively a continuation of the passage E and of the passage $B^2$. The eight radially extending partitions $r$, divide the annular remaining space of said cap into eight equal distributing compartments, which compartments operate in pairs, each pair comprising the compartments M and M' to the number of three pair or six compartments and the fourth pair comprising the compartments M and $M^2$ as seen in Figs. 3 and 7. The compartments M, M' and $M^2$ correspond with the chambers N, N', of the distributing section H, and the radial partitions $r$ are flush at both top and bottom with the perimeter of the cap, and the said partitions register with the radial walls $n$ of the section H.

The annular passage $B^3$ of the outlet cap C, is inclosed at the top by a circular diaphragm or plate, $t$, properly mounted upon the walls $a^2$ and $b^2$ and rigidly secured thereto, as seen in Figs. 2 and 3, and one of the compartments as $M^2$ is in like manner inclosed at the top by a plate $v$, which may be simply an extension of and integral with the plate, $t$, thus forming an outlet compartment as seen in Figs. 2 and 3. The outlet compartment $M^2$ thus inclosed has a portion of the wall $b^2$ cut away to form a lateral opening $v'$ into the annular outlet passage $B^3$ and thence into the discharge port B of Figs. 1 and 3. The outlet cap thus described has its bearing surfaces properly ground and is adapted for rotation upon the section H.

The top or inlet cap C', inclosed by the plate $u$ and provided with the interior annular wall or partition $g$, adapted to register with the partition $b^2$, and having the annular space between the perimeter $u$ and the wall $g$ divided by partitions $f$ and $f''$ into eight equal compartments P and P' corresponding to the compartments M and M', also has its lower surface properly ground and is adapted to be rotated upon the lower or outlet cap C, the caps thus described being adapted to be rotated upon the section H, independently of each other. The radial partitions, $f'$, between the compartments of each pair are provided with a suitable opening next to the upper surface of the cap, in each case except in the case of the last pair, as seen in Fig. 4. One of the compartments as $P^2$ is provided with an opening $h$, in the cylindrical wall $g$, which is adapted to thus form a continuous passage for the gas from the inlet A to any purifier in the series.

Fig. 6 exhibits another and preferable form of the top or inlet cap having a central cylindrical wall $g'$, adapted to register with the wall $a^2$ of the outlet cap C and is flush with the perimeter and radial walls thereof. The radial partitions $f$ and $f'$ are extended to the central wall $g'$, the radial partition $f^2$ being cut away flush with the wall $g$ and is thus adapted to form a support for the plate $t$, while the radial partitions $f$ on either side thereof are extended tangentially to the wall $g'$, which is cut away between the said partitions $f$, thus doubling the width of the gas passage $h$ shown in Fig. 4. The partitions $f$ are flush with the perimeter and the wall $g'$, but the walls $f'$ are cut away at the top to form proper gas passages between the said compartments of each pair in the usual and well understood manner.

The operation of my improved center valve thus described is briefly stated substantially as follows: The unpurified gas enters the inlet port A and passes up through the central passage consisting of the tubular sections A', E and F into the chamber G of the top or inlet cap C'. The top or inlet cap C', being normally so placed upon the outlet cap C that the compartment $P^2$, will be directly over the covered outlet compartment $M^2$, said cap C' is now so rotated as to bring the compartment $P^2$ over one of the compartments M, thereby permitting gas to pass from chamber G, through the lateral opening $h$ into compartment $P^2$, and thence down through the compartments M and N which register therewith and thence out through one of the ports I to the first purifier box 1, from whence the gas returns to the center valve through the port O, entering one of the compartments N', from which it passes up through the corresponding compartment M', into the compartment P' and thence through the passage in the partition wall $f'$, into the adjacent compartment P, from which it again passes down through compartments M and N and thence through port I to the second purifier box 2, in the series, as above described. After passing through the desired number of purifiers, the gas passes into the outlet compartments $M^2$, and thence through its lateral opening $v'$, into the annular outlet passage $B^3$ and thence down to the outlet port B. This arrangement of the different parts of the valve, when designed for four purifying boxes, passes the gas through any three of the boxes and the fourth may be cleansed. By rotating both caps (allowing them to retain the same relative position) one quarter turn to the right, the box that was at first No. 1 in the series will be made the last of the series. By rotating both caps together upon section H, in the same relative position, any one of the boxes may be thrown out of use at pleasure. If in the present instance, the top or inlet cap C', be kept stationary and the outlet cap be given a quarter turn to the right the fourth box will be brought into the circuit. If the bottom or outlet cap be rotated to the left one quarter turn the second box will be brought into the series. Thus it is evident that by turning the lower or outlet cap one quarter turn or revolution at a time any box may be made the last of the series. In like manner by rotating the top or inlet cap independently of the outlet cap any box may readily be made the first of the series. It has heretofore been proposed to provide the valve chamber or cap of a center seal with a central hollow plug valve, having one or more lateral openings in its side wall and also having one or more re-entrant walls each forming a by-pass for connecting compartments of the cap in pairs.

My invention is distinguished from the devices heretofore proposed by the provision of a revoluble outlet cap containing an outlet compartment M², closed at the top by a plate, $v$, and having a lateral opening $v'$, into the annular outlet passage leading to the discharge pipe B of the center seal; also by the provision of a revoluble inlet cap mounted on said outlet cap and containing a central inlet chamber G, having a lateral opening $h$ and also provided with radial partition plates dividing it into compartments.

My outlet cap C, can be readily turned upon the distributing section H, so as to bring its outlet compartment M² into connection with port O, connecting with the outlet pipe of any one of the four purifying boxes. My inlet cap C' may be independently turned upon the cap C, so that its inlet chamber G, will be made to connect with the port I, connecting with the inlet pipe of any one of the four purifying boxes. It will be evident therefore that any one box may be shut out of circuit and brought back at will and that all four of the boxes can be connected into the circuit and used for purifying gas at the same time.

My devices are simpler in construction and more convenient to operate than the devices heretofore proposed for distributing gas to and through four purifying boxes and shutting off any one box at will and connecting it into the circuit when desired.

Having described my invention, what I claim, and desire to secure by Letters Patent, is—

1. In a center valve or seal, the combination with the distributing section and its seal pot, of a rotatable outlet cap divided by radial partitions into compartments, and having an outlet compartment M², closed at the top and provided with a lateral opening $v'$, into the annular outlet passage of the valve, and a rotatable inlet cap mounted on said outlet cap and having a passage communicating with the compartments of the distributing section of the valve, substantially as and for the purpose described.

2. In a center valve or seal, the combination with the distributing section H, constructed with a central inlet passage and an annular outlet passage and with radial partitions dividing it into compartments, of a rotatable outlet valve C, mounted upon said section and divided by radial partitions into compartments corresponding with those of said distributing section, also having central and annular gas passages, and, as a distinctive feature, a separate outlet compartment or passage closed at the top and opening into the annular outlet passage of the valve, whereby communication may be established with the outlet pipe of any purifier, and a rotatable inlet cap, C', mounted on cap C, suitably divided into compartments and having a separate passageway, whereby communication may be established between the inlet passage of the valve and the inlet pipe of any one of the purifier boxes in the series, substantially as described.

3. In a center seal or valve, the combination with the distributing section divided into compartments and having inlet and outlet passages of the usual construction and the seal pot constructed with the usual inlet and outlet ports and passages, of the rotatable outlet cap C, mounted on the said distributing section and provided with compartments, a central passage F, and annular passage B³, closed at the top by a plate, $t$, and the outlet chamber M², closed at the top by plate $v$, and having a lateral opening $v'$ into the outlet passage B³, and the inlet cap C', adapted to rotate upon the cap C independently of or in unison therewith and provided with pairs of communicating compartments P, P', a circular wall $g$, forming the central chamber G, and having a lateral passage $h$, into one of the compartments as P², substantially as and for the purpose described.

Signed by me, at Fort Wayne, Indiana, this 29th day of March, 1893.

CHRISTIAN BAHRET.

Witnesses:
C. J. McLAIN,
W. C. McCOWAN.